Dec. 20, 1932.   A. N. BENN   1,891,467
APPARATUS FOR PREPARING MEAT FOR SMOKING
Filed Sept. 22, 1930
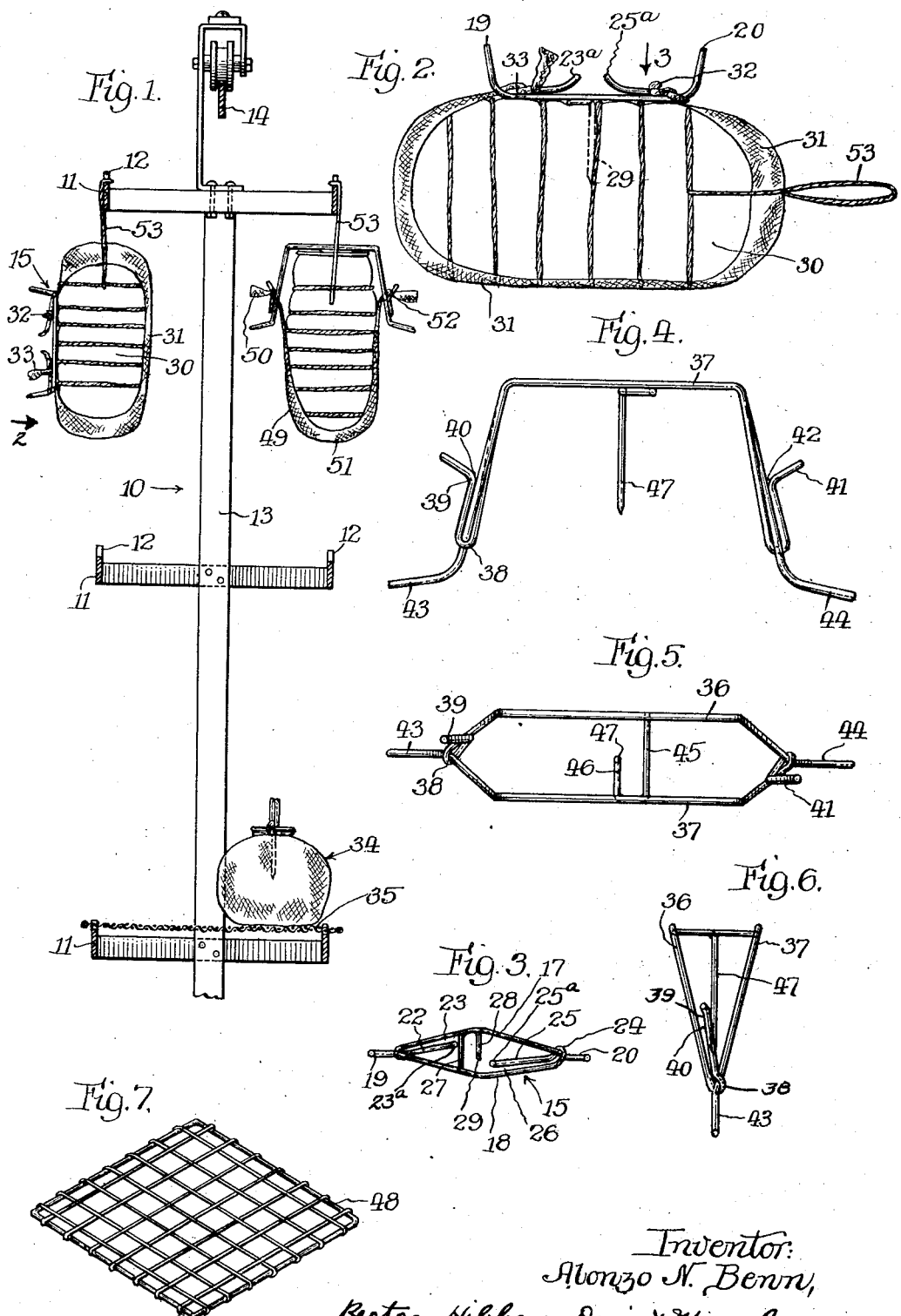
Inventor:
Alonzo N. Benn,
Rector, Hibben, Davis & Macauley
Attys.

Patented Dec. 20, 1932

1,891,467

UNITED STATES PATENT OFFICE

ALONZO N. BENN, OF CHICAGO, ILLINOIS

APPARATUS FOR PREPARING MEAT FOR SMOKING

Application filed September 22, 1930. Serial No. 483,543.

My invention relates to an apparatus for preparing meat for smoking and is concerned more particularly with those classes of meat which are suspended during the smoking operation, although susceptible of adaptation to meats which are supported in other ways.

The principal object of my invention is to devise an apparatus for use in applying a smoking cloth to the portion of the meat which it is desired to shape and protect during the smoking operation and to accomplish this result with ease, rapidity, and economy in the amount of cloth required, and the attainment of a characteristic, individual, shaping pressure which is determined solely by the degree of tautness with which the cloth is initially applied and is independent of any deforming tendency arising from gravity action on the meat in the event that the latter is suspended.

A further object is to devise an apparatus of the character described which is carried by the meat and to which the ends of the smoking cloth are attached, generally prior to the positioning of the meat on a smokehouse trolley, or other meat-carrying device.

A further object is to devise an apparatus which is particularly adapted for use in connection with rolled meats in general, the nature of the device being such that the ends of the smoking cloth may be attached thereto and suitable pressure applied to both ends of the meat roll by means of the cloth in order to secure the desired shaping of the ends.

For purpose of illustration, my improved apparatus and its use will be described in connection with a pork roll, which it is contemplated will be suspended from a smokehouse trolley, but it will be understood that the broadest aspects of the invention contemplate its application to smoked meats in general which have either been completely boned, or from which the major portion of the bone has been removed, and regardless of the manner in which the meat is supported during the smoking operation. Meats of the character contemplated include pork and beef ham rolls, pork shoulder or picnic rolls, beef insides, outsides, knuckles, and kindred types of meat.

The present invention is intended to overcome the disadvantages now inherent in boned, smoked meats generally, respecting misshapen and ill-shaped ends which are not only highly productive of waste in slicing the same, but which lessen the attractiveness of the meat and therefore affect its marketability. Meats of this character are simply hung from a suitable stick or the rail of a smokehouse trolley, or merely carried in suitable containers or baskets during the smoking operation. Prior to smoking, they have been cured and at this time are so extremely soft and pliable that present, uncontrolled methods of smoking create protruding and irregularly shaped ends which constitute a source of waste and consequently affect the price of the product, since these ends must be removed in the sale of the meat before full, regular slices can be obtained.

It is the express object of the present invention to preshape these soft meats by applying a characteristic pressure to certain portions thereof, particularly the ends in the case of rolled meats, and to maintain this pressure during the smoking operation. The characteristics of the meats themselves provide the necessary standard for determining the shaping pressure, so that the ends of meats which have been smoked after being prepared according to my invention, present a uniform and attractive appearance. Briefly, the practice of the invention consists in drawing the smoking cloth around the ends, or end, to be shaped, as tightly as the conformation of the meat will permit, without undue distortion, and then securing the ends of the cloth to a novel apparatus which is carried by the meat as described more fully hereinafter. The finished product will therefore exhibit marked advantages over present similar classes of meat, both from the standpoint of appearance and a substantially absolute avoidance of waste, since the meat may be sliced from the beginning as desired. Meats so pre-treated, even when suspended from a smoking trolley during the smoking operation, will be entirely free from the distorting effects usually created by the action of gravity on soft meats of this character, since it will be obvious that, owing to the binding action of the smoking cloth, gravity will have absolutely no effect in shaping the meat.

These and further objects of my invention will be set forth in the following specification, reference being had to the accompanying drawing and the novel means by which said objects are effectuated will be definitely pointed out in the claims.

In the drawing:

Figure 1 is a partial, sectional elevation of a smokehouse trolley, showing three ways for supporting rolled meats thereon for smoking and two types of apparatus for securing the ends of the smoking cloth.

Fig. 2 is an enlarged view of the upper left-hand meat roll, as viewed in Fig. 1, the roll being turned through an angle of 90 degrees.

Fig. 3 is a plan view of the cloth securing apparatus shown in Fig. 2, looking in the direction of the arrow 3 in said figure.

Figs. 4, 5, and 6 are side, plan and end views, respectively, of the form of apparatus which is shown mounted on the upper, right hand meat roll in Fig. 1.

Fig. 7 is a perspective view of a grid structure which may be employed in connection with the form of apparatus shown in Fig. 4.

Referring to Fig. 1, the numeral 10 represents a portion of a smokehouse trolley which is provided with the usual spaced, horizontal bars 11, having the customary spaced, serrations, or notches, 12, and which are connected at their ends by the vertical uprights 13. The trolley 13 is supported by any approved hanger structure for movement along a rail 14 from place to place in the smokehouse, as is customary in structures of this nature. The precise construction of the trolley forms no part of the present invention and has been merely referred to as indicating one type of supporting structure for the meat. From such a structure, the meat may be suspended as indicated by the two upper pieces in Fig. 1, or it may simply rest upon a suitable sub-structure, as indicated by the lower piece of meat in the same figure. Prior to disposing the meat on the trolley, however, the former will have applied thereto the member and length of smoking cloth which together form my improved apparatus, as will now be described.

For securing and binding a length of smoking cloth around the opposite ends of a rolled piece of meat, or meats of other description, whose ends it is desired to pre-shape, the member illustrated in Figs. 2 and 3, as well as the upper, left-hand corner of Fig. 1, is employed. The member 15 in question is preferably formed of wire as affording the necessary structural strength and characteristic type of functioning desired, without preventing the access of the hot gases and smoke to the uncovered surface of the meat. Accordingly, said member comprises a pair of wires 17 and 18 which are spaced from each other for the major portion of their length intermediate their ends in a substantially bowed fashion, as clearly shown in Fig. 3, said wires approaching each other at the ends of the bow. The wire 18, at one end thereof is extended beyond the adjacent, closed end of the bow to form an arm 19 which preferably extends upwardly, as shown clearly in Fig. 2, out of the common plane in which lie the bowed portions of the wires 17 and 18. Similarly, the end of the wire 17 at the opposite end of the member 15 extends beyond the adjacent, closed end of the bow and upwardly therefrom to form an arm 20. At the left end of the member 15, the wire 17 may be tightly bent around, or otherwise secured to the wire 18 at the indicated point, whereupon the wire 17 is reversely bent in spaced relation to the adjacent portion of the wire 18 to form a prong 22 which defines with the adjacent portion of the wire 17 a bight 23 for a purpose hereinafter explained. The extremity of the prong 22 may be bent upwardly as at 23$^a$, if desired. At the opposite end of the member 15, the wire 18 is tightly bent around the wire 17, or otherwise secured thereto and thereafter bent in spaced relation to the adjacent portion of the wire 18 to form a prong 25 which, together with the adjacent portion of the wire 18, defines a bight 26. As with the extremity of the prong 22, the similar portion of the prong 25 may be bent upwardly as at 25$^a$. Intermediate the closed ends of the member 15, a wire 27 is bridged between the wires 17 and 18 and secured thereto in any approved manner. At one end of the wire 27, the latter is reversely bent for extension to an intermediate point between the wires 17 and 18 to define an arm 28 and thereafter bent downwardly to provide a spike 29 which is embedded in the meat when the member 15 is positioned thereon.

From the above description, it will be understood that, since the arms 19 and 20, and the extremities of the prongs 22 and 25 are bent upwardly, or in the same direction from the common plane which includes the wires 17 and 18, the opposite side of the member 15 is free of any projection except for the spike 29. Accordingly, the member 15 is peculiarly adapted for lying in snug relation to and along a surface of a piece of meat, the advantages of which will become more apparent hereinafter.

In using the improved type of smoking member just described, it will be positioned on one side of the piece of meat 30, which in the case of a rolled piece will have been previously corded in the usual manner, the spike 29 being driven into the body of the meat to position the member 15 in the location shown in Fig. 2. The operator will then knot as at 32 one end of a length of smoking cloth 31 and will insert the knotted end in the bight 26, for example, and will then carry the same around the right end of the roll, along the underside thereof, around the left end of the roll, and will then slip the free end of the cloth in the bight 23, thence around the outside of the arm 19, thence across the opposite side of said arm for reinsertion in the bight 23, a succession of movements which effectually secures the indicated end of the cloth in position through frictional contact of the cloth portions with each other and with the adjacent portions of member 15, the character of securement being such as to increase the security of attachment as the pulling force on said cloth is increased. Of course, it will be understood that, prior to the looping of the free end of a smoking cloth through the bight 23 and around the arm 19, said cloth will have been drawn as tightly as the conformation of the meat will permit in order to secure the desired preshaping of the ends of the meat 30. The latter is then strung with the usual supporting cord 53, after which the meat 30 may be suspended from one of the bars 11 so that the meat will be hung as indicated in the upper, left hand corner of Fig. 1. Instead of suspending the piece 30 as just described, the latter may be simply supported on a grid 35 which is bridged between a pair of the trolley bars 11, as indicated by the numeral 34 in Fig. 1. This arrangement attains the same result so far as the preshaping of the ends of the meat is concerned, while the smoking cloth effectually protects the exposed meat portions on the underside of the roll which may have direct contact with the hot gases rising upwardly through the grid 35.

The modified type of member shown in Figs. 4 to 7, inclusive, and in the upper, right hand corner of Fig. 1, differs from the member heretofore described in that the smoking cloth is employed to preshape only one end of the meat, the opposite end of the meat being shaped by an additional element which will be presently described. Except for this additional element, the apparatus when assembled resembles in its broadest aspect the constructions disclosed and claimed in my copending applications, Serial Nos. 399,136 and 432,031, filed October 12, 1929, and February 28, 1930, respectively, although certain improvements have been made in the construction of the cloth securing member. This modified member is likewise preferably formed of wire for the same reasons as noted in connection with the member 15 and comprises a pair of inverted, U-shaped lengths of wire 36 and 37 which are spaced from each other along their horizontal portions, as shown in Fig. 5, and the side portions of which may be directed toward each other in a V-shaped relation for joinder adjacent their lower ends in the manner now specifically set forth. The vertex of the left hand, V-shaped portion is formed by tightly bending the adjacent end of the wire 36 around the wire 37, as indicated by the numeral 38 in Fig. 5, although the connection between the wires 36 and 37 at this point may be made in other ways as by welding or soldering, the free end of the wire 36 then being given a return bend in spaced relation to the adjacent portion of the wire 36 to form a prong 39 which defines with said adjacent portion a bight 40. Similarly, the vertex of the right-hand V-shaped portion is formed by tightly bending the free end of the wire 37 around the adjacent portion of the wire 36, or, as desired, this connection may be formed in other manners as noted above, said free end of the wire 37 then being given a return bend upwardly in diverging relation to the adjacent portion of the wire 36 to form a prong 41 which defines with said adjacent portion a bight 42. At the left end of this member, the wire 37 may extend beyond the adjacent vertex and be bent outwardly from the plane including the left, V-shaped portion to provide an arm 43, while the wire 36 may be similarly formed at the right end of the member to provide an arm 44, both of said arms being provided for a purpose hereinafter explained. In order to effectually position the member on the meat, a length of wire 45 is bridged between the horizontal portions of the wires 36 and 37 and one end of said wire is given a return bend to provide an arm 46 which terminates intermediate the horizontal portions of the wires 36 and 37 and is then bent downwardly in the same general direction as the V-shaped portions of the member to define a spike 47.

The grid structure illustrated in Fig. 7 is employed in connection with the member just described. Specifically, the grid 48 is first placed against one end of the meat roll which has been previously corded in the usual manner, whereupon the member is seated on the grid with the spike 47 inserted between the wires thereof and embedded within the body of the meat, and the V-shaped portions of the member extending downwardly on opposite sides thereof, as shown in the upper right hand corner of Fig. 1. The operator then forms a knot 50 on one end of a length of smoking cloth 49, slips the knotted end in the bight 40 to thereby securely fasten the indicated end of the cloth on the member, then passes the cloth 49 around the then uncovered end of the meat roll and upwardly along the opposite side thereof for insertion through the bight 42. The free end of the cloth is then drawn tightly to correctly preshape that end of the roll which is covered by said cloth, which action will also exercise a tightening pressure against the grid 48 with a consequent shaping of the end of the roll in contact therewith, whereupon the free end of the cloth will be bent around under the arm 44 then upwardly over said arm for reinsertion in the bight 42, thus adequately locking said free end for reasons noted above. The piece of meat will then be strung with the usual suspending cord 53, whereupon said piece will be hung from the trolley in the manner indicated in Fig. 1.

Whichever of the above noted methods of applying a smoking cloth to meats in general is adopted, it will be apparent that the desired degree of initial shaping of the contacted portion of the meat may be effectually obtained with a maximum of ease on the part of the operator, a minimum of material required, and a certainty as to uniformity in results. Further, both of the types of cloth securing members illustrated are characterized by simplicity of structure and are capable of being easily cleaned. Moreover, in both instances, the manner of securing the cloth on the meat effectively prevents any distorting tendencies arising from the action of gravity, since the pressure applied to the meat is accomplished in a manner which depends solely upon the degree of tautness with which the ends of the smoking cloth are drawn.

While I have shown one set of elements and combinations thereof for effectuating my improved apparatus for the preparation of meat for smoking, it will be understood that the same is intended for purpose of illustration only and in no wise to restrict my construction to the exact forms and structures shown, for many changes may be made therein without departing from the spirit of my invention.

I claim:

1. An apparatus for smoking meat comprising a member adapted to be positioned on the side of the meat, and a smoking cloth adapted to be bound around the opposite ends of the meat for preshaping the same, said cloth being attached at its ends to said member.

2. An apparatus for smoking meat comprising a member adapted to be positioned on the side of the meat, attaching means formed on said member, and a smoking cloth adapted to be bound around the opposite ends of the meat, said cloth being attached at its ends to said member for preshaping the meat.

3. An apparatus for smoking meat comprising a member adapted to be positioned on the side of the meat, prongs on said member offset therefrom to define bights, and a smoking cloth adapted to be bound around the opposite ends of the meat for preshaping the same, said cloth being attached at its ends within said bights.

4. An apparatus for smoking meat comprising a member adapted to be positioned on the side of the meat, prongs formed on said member, and a smoking cloth adapted to be bound around the opposite ends of the meat for preshaping the same, said cloth being attached at its ends to said prongs.

5. An apparatus for smoking meat adapted to be positioned on the side of the meat and having a pair of V-shaped arms arranged in opposed relation and disposed in substantially the same plane, attaching means formed on said arms, and a smoking cloth adapted to be bound around the opposite ends of the meat for preshaping the same, said cloth being attached at its ends to said means.

6. An apparatus for smoking meat comprising a member adapted to be positioned on the side of the meat, said member being composed of a pair of wires spaced from each other for the major portion of their lengths and connected adjacent their ends, one of said wires at one end of said member extending beyond the adjacent connection point to form an arm and the other wire extending beyond the opposite connection point to form a second arm, the portion of that wire at each end of said member which is not extended to form an arm being reversely bent to define attaching prongs, and a smoking cloth adapted to be bound around the opposite ends of the meat for preshaping the same, said cloth being attached at its ends to said prongs.

7. An apparatus for smoking meat comprising a member adapted to be positioned on the meat, the meat contacting side of said member being substantially flat whereby the member may snugly adhere to the meat surface, and a smoking cloth adapted to be bound around other portions of the meat, said cloth being secured at its ends to said member.

8. An apparatus for smoking meat comprising a member adapted to be positioned on the meat, a positioning spike for embedding in the meat, the meat contacting side of said member except for said spike being substantially flat whereby the member may snugly adhere to the meat surface, and a smoking cloth adapted to be bound around other portions of the meat, said cloth being secured at its ends to said member.

9. An apparatus for smoking meat comprising a member adapted to be positioned on the side of the meat, a positioning spike for embedding in the meat, and a smoking cloth bound around the opposite ends of the meat for preshaping the same, said cloth being attached at its ends to said member.

10. An apparatus for smoking meat consisting of a member adapted to be positioned on the meat, said member comprising a pair of wires spaced from each other and one of said wires at each end of the member being closely bent around the other wire to form connections therewith and attaching prongs, and a smoking cloth adapted to be bound around other portions of the meat, said cloth being secured at its ends to said member.

11. An apparatus for smoking meat comprising a member adapted to be positioned on the side of the meat, said member being composed of a pair of wires spaced from each other for the major portion of their length and connected adjacent their ends, one of said wires at each end of the member being closely bent around the other wire to form connections therewith and reversely directed to form attaching prongs, and a smoking cloth adapted to be bound around the opposite ends of the meat for preshaping the same, said cloth being secured at its ends to said prongs.

12. An apparatus for smoking meat adapted to be positioned on the side of the meat comprising a skeleton structure having a pair of arms arranged in opposed relation and disposed in substantially the same plane, attaching means formed on said arms, and a smoking cloth bound around the opposite ends of the meat for preshaping the same, said cloth being attached at its ends to said means.

13. An apparatus for smoking meat adapted to be positioned on the side of the meat and comprising a pair of wires spaced from each other, one of said wires at each end of the member being closely bent around the other wire to form connections therewith and attaching prongs, a third wire bridged between the spaced portions of said wires and having a spike part projecting away from the plane including said pair of wires, and a smoking cloth adapted to be bound around the opposite ends of the meat for preshaping the same, said cloth being adapted for attachment at its ends to said prongs.

In testimony whereof, I have subscribed my name.

ALONZO N. BENN.